(12) United States Patent
Otterstedt et al.

(10) Patent No.: US 8,747,488 B2
(45) Date of Patent: Jun. 10, 2014

(54) CAPACITOR ANODE

(75) Inventors: Ralph Otterstedt, Goslar (DE); Marianne Gottschling, Goslar (DE)

(73) Assignee: H. C. Starck GmbH, Goslar (DE)

( * ) Notice: Subject to any disclaimer, the term of this patent is extended or adjusted under 35 U.S.C. 154(b) by 104 days.

(21) Appl. No.: 13/140,430

(22) PCT Filed: Dec. 7, 2009

(86) PCT No.: PCT/EP2009/066513
§ 371 (c)(1),
(2), (4) Date: Jun. 17, 2011

(87) PCT Pub. No.: WO2010/079029
PCT Pub. Date: Jul. 15, 2010

(65) Prior Publication Data
US 2012/0033350 A1 Feb. 9, 2012

(30) Foreign Application Priority Data
Dec. 19, 2008 (DE) .......................... 10 2008 063 853

(51) Int. Cl.
*H01G 9/00* (2006.01)

(52) U.S. Cl.
USPC ....................................... 29/25.03

(58) Field of Classification Search
None
See application file for complete search history.

(56) References Cited

U.S. PATENT DOCUMENTS

| | | | |
|---|---|---|---|
| 3,465,426 A | 9/1969 | Baier et al. | |
| 5,711,988 A | 1/1998 | Tsai et al. | |
| 6,439,115 B1 | 8/2002 | Michiels et al. | |
| 6,493,213 B1 | 12/2002 | Clasen et al. | |
| 6,510,044 B1 | 1/2003 | Loeffelholz et al. | |
| 6,865,069 B2 * | 3/2005 | Kabe et al. .................... | 361/508 |
| 2003/0026756 A1 | 2/2003 | Kimmel et al. | |
| 2003/0104923 A1 | 6/2003 | Omori et al. | |
| 2004/0195093 A1 | 10/2004 | Cohen et al. | |
| 2004/0233614 A1 | 11/2004 | Naito et al. | |
| 2005/0013765 A1 | 1/2005 | Thomas et al. | |
| 2005/0018384 A1 | 1/2005 | Schnitter | |
| 2007/0180950 A1 | 8/2007 | Thon | |
| 2008/0123251 A1 | 5/2008 | Randall et al. | |
| 2008/0232030 A1 | 9/2008 | Jones et al. | |
| 2010/0025876 A1 | 2/2010 | Biler et al. | |

FOREIGN PATENT DOCUMENTS

| | | |
|---|---|---|
| DE | 101 92 560 B4 | 2/2007 |
| EP | 1 114 430 A1 | 7/2001 |
| EP | 1 208 573 A1 | 5/2002 |
| EP | 1 399 937 A1 | 3/2004 |
| EP | 1 818 956 A2 | 8/2007 |

(Continued)

OTHER PUBLICATIONS

H. W. Lin et al.: "The rheological behaviors of screen-printing pastes", Journal of Materials Processing Technology, vol. 197, pp. 284-291 (2008).

*Primary Examiner* — Seahvosh Nikmanesh
(74) *Attorney, Agent, or Firm* — Norman B. Thot

(57) ABSTRACT

A process for producing a solid electrolyte capacitor with an anode comprising a sintered fine $NbO_x$ powder, where $0.5 < x < 1.7$, includes forming a green anode body. The forming is essentially performed without applying a pressure. The green anode body is sintered so as to provide a sintered anode body. The sintered anode body is electrolytically oxidized so as to provide an electrolytically oxidized anode body. The electrolytically oxidized anode body is provided with a cathode so as to provide the solid electrolyte capacitor.

10 Claims, 5 Drawing Sheets

(56) References Cited

FOREIGN PATENT DOCUMENTS

| JP | 2005-35885 A | 2/2005 |
| JP | 2008-277811 A | 11/2008 |
| RU | 2 193 927 C2 | 12/2002 |
| RU | 2 299 786 C2 | 5/2007 |
| WO | WO 2006/117787 A1 | 11/2006 |
| WO | WO 2008/003938 A1 | 1/2008 |
| WO | WO 2008/067419 A2 | 6/2008 |

* cited by examiner

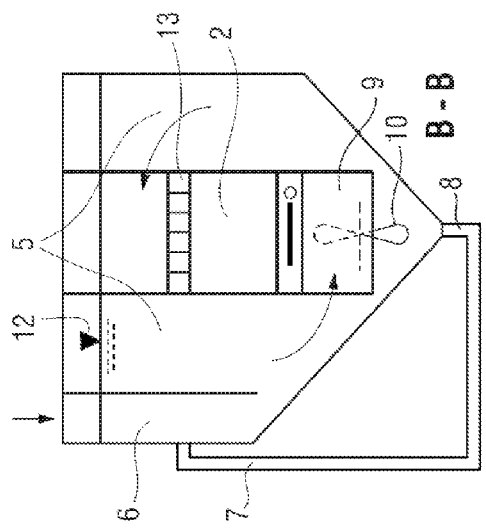
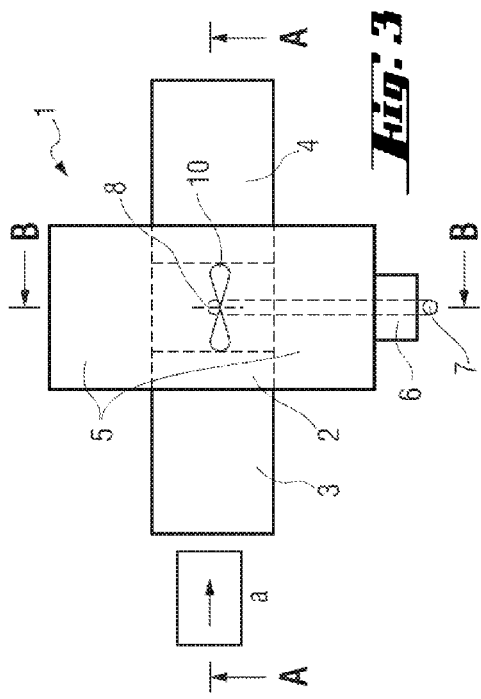
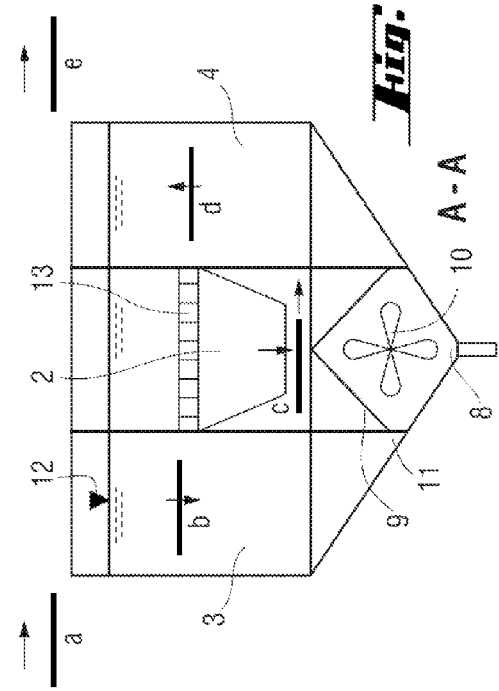

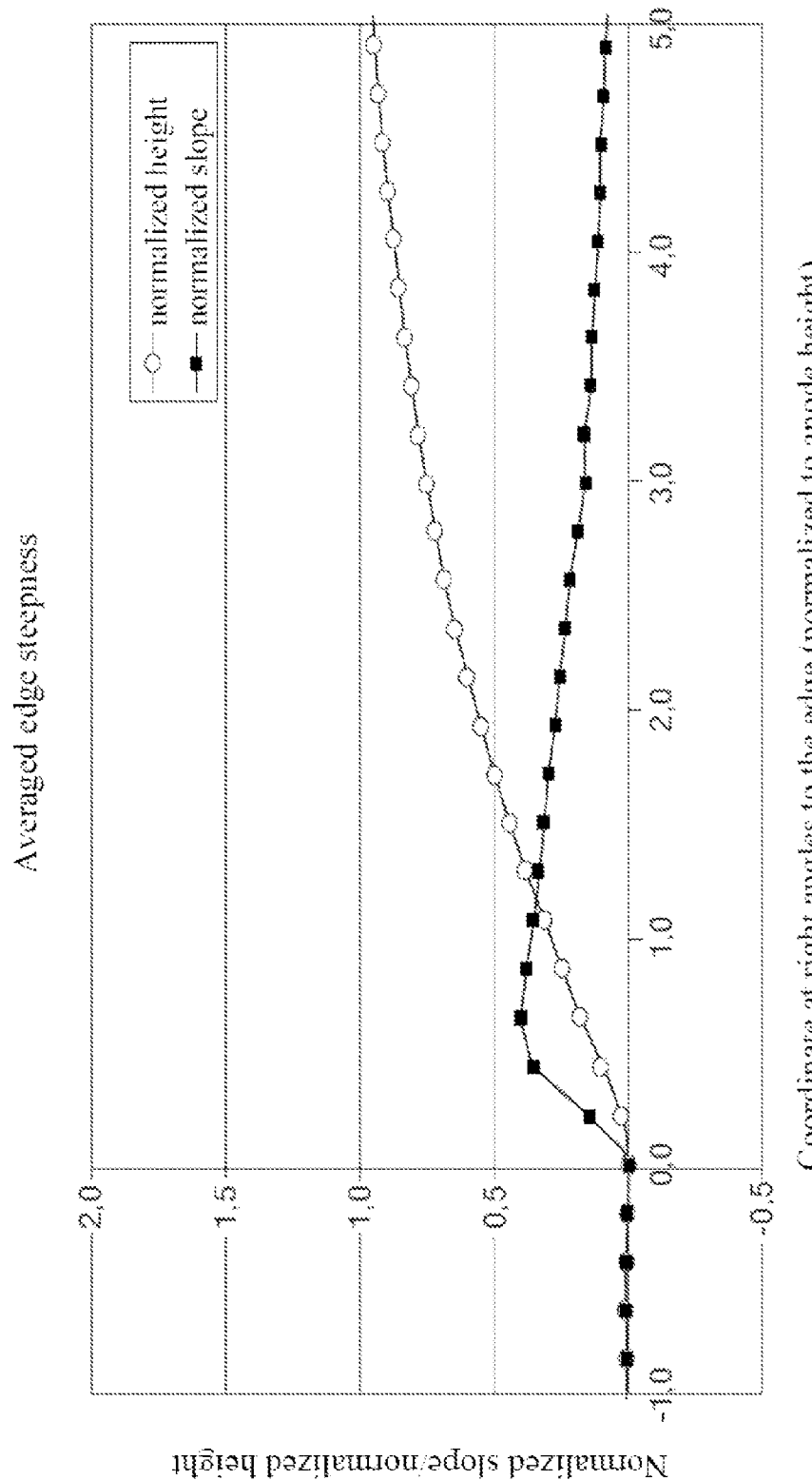

CAPACITOR ANODE

CROSS REFERENCE TO PRIOR APPLICATIONS

This application is a U.S. National Phase application under 35 U.S.C. §371 of International Application No. PCT/EP2009/066513, filed on Dec. 7, 2009 and which claims benefit to German Patent Application No. 10 2008 063 853.6, filed on Dec. 19, 2008. The International Application was published in German on Jul. 15, 2010 as WO 2010/079029 A2 under PCT Article 21(2).

FIELD

The present invention provides a solid electrolyte capacitor anode based on NbO, a process for the production thereof, and solid electrolyte capacitors with an NbO anode.

BACKGROUND

Solid electrolyte capacitors with a niobium pentoxide or tantalum pentoxide dielectric have found wide use in the electronics industry. They are based on the high dielectric constants of niobium pentoxide and tantalum pentoxide, which forms the insulator layer in such capacitors. The anodes are produced by sintering finely divided porous agglomerates of tantalum or niobium primary particles to give porous anode bodies with correspondingly large surface area, the sintering being preceded by processing the agglomerates to give dimensionally stable pressed bodies which are then sintered under high vacuum at a temperature of 1000 to 1500° C. over 10 to 30 minutes. The pentoxide layer on the surface of the sintered bodies (anodes) is then obtained by electrolytic oxidation (i.e., by forming/anodizing/anodically oxidizing), the thickness of said layer being determined by the maximum voltage of the electrolytic oxidation (forming voltage). The cathode is obtained by impregnating the sponge-like structure with manganese nitrate, which is converted thermally to manganese dioxide, or with a liquid precursor of a polymer electrolyte and polymerization, or a polymer dispersion of a conductive polymer.

Niobium suboxide, $NbO_x$ where x=0.5 to 1.7, is in principle also suitable as an anode material owing to its high conductivity. Accordingly, there have recently been various proposals to use NbO as a replacement for niobium or tantalum metal as an anode material. The industrial use of NbO as an anode material has, however, not to date been possible because capacitors produced therefrom have too high a residual current, and a complete anode produced in the same way exhibits an extremely broad distribution of the specific residual current. Many capacitors from one production batch have a tendency to suffer voltage breakdowns, making them unusable.

The reason for the poor performance of capacitors with NbO anodes appears to lie in a defect structure obtained as a result of the production process: in contrast to the ductile metals Nb and Ta, NbO is a comparatively brittle oxide ceramic which, during the shaping of the anode, apparently suffers defects, for example, in the form of microcracks, which only heal incompletely even in the course of sintering.

It has now been found that such defects do not occur when the shaping of the anode body before the sintering is effected at ambient pressure.

SUMMARY

In an embodiment, the present invention provides a process for producing a solid electrolyte capacitor with an anode comprising a sintered fine NbOx powder, where 0.5<x<1.7, which includes forming a green anode body. The forming is essentially performed without applying a pressure. The green anode body is sintered so as to provide a sintered anode body. The sintered anode body is electrolytically oxidized so as to provide an electrolytically oxidized anode body. The electrolytically oxidized anode body is provided with a cathode so as to provide the solid electrolyte capacitor.

BRIEF DESCRIPTION OF THE DRAWINGS

The present invention is described in greater detail below on the basis of embodiments and of the drawings in which:

FIG. 3 shows a schematic of an apparatus suitable for the sedimentation forming process in a top view;

FIG. 4 shows a section A-A through the apparatus according to FIG. 3;

FIG. 5 shows a section B-B through the apparatus according to FIG. 4. In FIGS. 4 and 5, cut surfaces are shown by thick lines and visible lines by thin lines, unless otherwise evident from the context;

FIG. 8 shows the edge profile averaged over 20 measurement sites and normalized to the mean anode end height, and the slope, determined therefrom, of the edge of a comparative anode.

DETAILED DESCRIPTION

Figure 1:
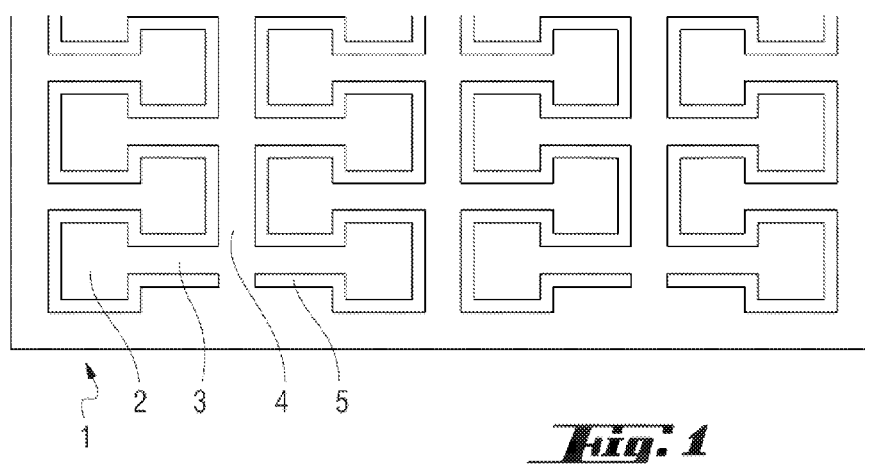
FIG. 1 shows the section of a niobium or tantalum foil suitable for the sedimentation forming process, with cut-out anode contact structures.

In an embodiment of the present invention, the $NbO_x$ powder is slurried in an inert liquid, such as in water, applied to, or filled into, flat niobium or tantalum metal foils (sheets), or those stamped with spoon, boat or barrel shapes, compacted by shaking by means of ultrasound, dried and sintered.

In an embodiment of the present invention, the $NbO_x$ powder can, for example, be applied from a dilute suspension by sedimentation. This involves conducting the niobium or tantalum foil (sheet) through a suspension bath such that the powder sediments on the foil or in the structures described above. An aqueous suspension can, for example, be used. The concentration of $NbO_x$ powder should, for example, be less than 50 g/l, for example, less than 10 g/l or for example, between 2 and 8 g/l. The feed rate into the suspension is continuously the same as that with which powder sedimented on the foil is discharged with the latter. After an initial adjustment phase, the powder particle size distribution which has become established in the suspension is that from which precisely such a particle size distribution which corresponds to the particle size distribution of the powder supplied sediments, such that segregation effects essentially do not occur. After the foil coated by sedimentation of the powder has been removed, it is routed over an ultrasound device, whereby the sedimented powder layer is compacted. The moist compacted power layer is dried. In the case of an aqueous suspension, drying at a temperature rising from 60 to 80° C. to from 150 to 180° C. over a period of several hours can be performed.

The $NbO_x$ powder used can, for example, be a presintered powder with a mean primary particle size of 200 to 1000 nm, for example, 400 to 800 nm (determined visually from SEM images). The secondary particle size (the size of the sintered primary particles) can, for example, be in the range from 100 to 180 µm (determined as the D50 value by Mastersizer, ASTM B 622). The secondary particle size distribution by Mastersizer can, for example, be defined by D10=30 to 70 µm, D50=100 to 180 µm and D90=200 to 300 µm. The secondary particles may have a spherical or irregular shape. An irregular shape can give rise to a more stable cake after sedimentation and ultrasound compaction.

In an embodiment of the present invention, the forming can be effected by applying a paste comprising the $NbO_x$ powder to the niobium or tantalum foil.

Processes for obtaining green anode bodies have already been proposed in connection with niobium and tantalum metal anode technology, in the form of screen printing, stencil printing, inkjet printing and dip molding processes, to obtain thin structures.

U.S. Pat. No. 3,465,426 describes a method for producing capacitor anodes in which the anode is produced by powder molding on a foil.

EP1114430B1 describes, for example, a specific paste for producing sintered refractory metal layers.

EP 1208573B1 describes anodes for electrolytic capacitors in which the anode body consists of continuously deformable material which can be solidified.

In these processes, a paste composed of the fine niobium or tantalum powder and an organic binder is used, which is applied to a substrate composed of niobium or tantalum sheet, and dried. The organic binder is subsequently removed by a first thermal treatment and then sintered.

These processes have the disadvantage that the anode material is doped with carbon during the removal of the organic binder. In spite of the improvement in paste formulations over time, it is not possible to bring the carbon content in the capacitor below 150 ppm. Carbon, however, is associated with undesirably high leakage currents. The process has therefore not become widespread in industry.

It has now been found that no carbon doping takes place in the case of use of $NbO_x$ powder in such pastes for capacitor production. The carbon can apparently be completely removed in the course of sintering at the latest due to the oxygen present.

In an embodiment of the present invention, the forming is effected by applying a paste comprising organic binder to a flat niobium or tantalum sheet, drying the paste, and removing the binder by heating to a temperature in the range from 150 to 550° C.

The forming of the anode structure by means of paste can, for example, be carried out by a stencil printing process. To this end, a stencil provided with cutouts is placed onto the niobium or tantalum foil which forms a flat anode contact, and the paste is incorporated into the cutouts of the stencil by means of a coating knife. The cutouts in the stencil have the shape of the desired two-dimensional form of the anode, for example, a rectangle with dimensions of a few millimeters in both directions. The thickness of the stencil approximately predetermines the thickness of the later anode structure. The thickness of the stencil may be between 50 and 500 µm, for example, between 100 and 300 µm.

In an embodiment, the present invention also provides flat anodes and capacitors, wherein the anode consists of a sponge-like sintered structure of niobium suboxide $NbO_x$ where 0.5<x<1.7, and which includes a correspondingly two-dimensionally extended anode contact surface of niobium and/or tantalum, wherein the carbon content of the anode structure is less than 25 ppm, for example, less than 15 ppm, or for example, less than 10 ppm.

The present invention also provides solid electrolyte capacitors with the above-described anode which have a specific residual current of less than 0.4 nA/µFV.

Pastes especially suitable for the stencil printing process are hereinafter described.

The binders used can, for example, be hydrocarbons, especially celluloses such as ethyl cellulose N7, N20, N100, N200 or N300, or hydroxypropyl cellulose of the Klucel H, Klucel M or Klucel G types from Hercules. Other suitable binders are polysaccharides, hemicelluloses, acrylates, polyester-polyurethanes, polyether-polyurethanes, urea-polyurethanes, polyvinyl alcohols, and binary or multinary mixtures thereof.

According to compatibility, the binders can, for example, be dissolved in a solvent such as terpineol, glycols, for example, ethylene glycol, 1,2-propylene glycol, butyl glycol, triethylene glycol, or else in water, optionally at slightly elevated temperature.

Surface-active substances (wetting agents, defoamers) can also be added to the binder, such as Surfinol 104 (from Air Products) or 242-(2-methoxyethoxy)ethoxylacetic acid (from Sigma-Aldrich) or Byk 024 (from BYK-Gardner), and/or rheological additives such as Rheolate 244 (from Elementis Specialities).

The $NbO_x$ powders used can, for example, be spherical secondary powders having a maximum particle size of 40 µm. The particle size distributions can, for example, be D10=0.5 to 1.5 µm, D50=1.5 to 3 µm and D90=7 to 12 µm. The mean primary particle size may be 200 to 600 nm.

The $NbO_x$ powder is incorporated into the binder system and homogenized on a three-roll mill. For easier wetting, the powder can be slurried before being incorporated in a wetting agent solution. The solids content of the paste also influences the viscosity thereof. The solids content is at least 70 and at most 87% by weight, for example, 75-85% by weight, of the overall formulation.

After the homogenization of the pastes, pastes with a viscosity, determined from the flow curve in the shear rate scan (rotation method) between 10 and 50 s$^{-1}$, recorded with a cone-plate analysis system with angle 4° and diameter 20 mm, of 80 to 100 Pas at 10 s$^{-1}$ and 3.5 to 10 Pas at 50 s$^{-1}$ is particularly suitable for the stencil printing process. Inventive pastes additionally feature rheological characteristics, characterized by the yield point, the elastic and viscous components of the complex viscosity in the linear-viscoelastic region and the extent of reduction therein on application of shear stress and of rise therein on removal of shear stress (thixotropic properties), which are adjusted so as to result in anodes with sufficiently steep edges and a flat surface.

The yield point is determined under shear stress control in oscillation mode of the rheometer at 1 Hz with a plate-plate geometry. By definition, the yield point has been exceeded when the elastic component of the complex viscosity is no longer independent of the shear stress, i.e., declines with rising shear stress. The value of the shear stress at which it is just still not possible to detect any decline in the elastic component is determined as the yield point.

At the yield point, the elastic component of the viscosity for inventive pastes is 500-15,000 Pas, for example, 750-7,500 Pas or for example, 1000-5,000 Pas. The viscous component of inventive pastes at the yield point is at least 0.5 and at most 1.5 times, for example, at least 0.75 and at most 1.25 times or for example, at least 0.9 and at most 1.1 times as great as the elastic component of the viscosity at the yield point.

For use in stencil printing, the rheological behavior of the paste under shear stress and after the shear stress has ended (thixotropic properties) is important for the quality of the printed image. The shear stress degrades the structure which causes the pseudoplasticity of the paste, the strength of which structure is characterized by the elastic component of the viscosity at the yield point. In inventive pastes, the elastic component at a shear stress three times higher than at the yield point is degraded by 50%, for example, by 75%, or for example, by 90%. The viscous component at a shear stress three times higher than at the yield point falls in accordance with the present invention to less than 2500 Pas, for example, to less than 1000 Pas, or for example, to less than 500 Pas.

After the shear stress has been reduced to the value at the yield point, the structure of the paste again builds up. According to the present invention, at least 25% and at most 90%, for example, 50-80%, of the structure (i.e., of the elastic component of the viscosity before the yield point is exceeded) has again built up after 5 seconds. The viscous component of the complex viscosity is, after the reduction in the shear stress, in accordance with the present invention at least 1.25 times to at most 10 times, for example, 2 to 5 times, greater than the elastic component of the complex viscosity.

The steepness of the anode edges is important for the exploitation of space by the rectangular standard capacitor geometries and should therefore not be too flat. A very sharp edge, as normally results in the pressing of anodes, is disadvantageous in that the passivation and coating of this edge involve additional complexity (for example a so-called core-shell passivation).

A dimensionless measure M for the steepness of an edge of an anode of height H, printed on a flat sheet, is defined as the distance S measured at right angles to the edge between the point where the anode begins to rise significantly from the sheet plane, and the point where at least the mean anode end height H is attained, normalized to the mean anode end height H.

This dimensionless measure H/S corresponds to the mean slope of the edge. When this measure, i.e., the mean slope, is one, this means that the distance is just as long as the anode is high. When the measure is two, the distance is half as long as the anode is high. For a vertical edge, the measure is undefined or is "infinite."

Since the profile of the edge is measured with a finite step width s of the laser profilometer, the maximum measurement is H/s. All edges with a slope between "infinite" and H/s are assigned the same measure H/s and are therefore indistinguishable.

The finite step width s should be selected such that H/s is at least 5.

To assess the whole edge width and to smooth scatter, the height is measured at at least 20 sites along the edge and averaged arithmetically.

In the case of inventive anodes, the dimensionless measure M has values between 0.5 and 4.5, for example, 1-4.5, or for example, 2.5-4.5.

Figure 2:
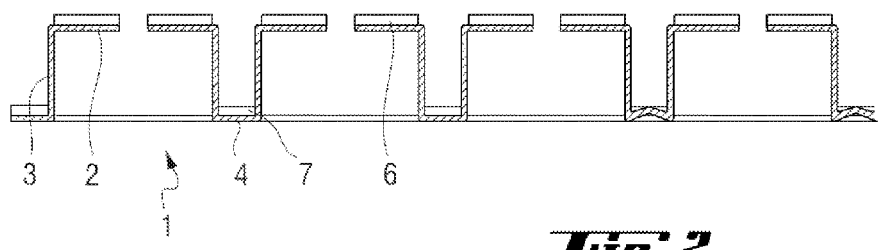
FIG. 2 shows the structure according to FIG. 1 as it can, for example, be used.

As shown in FIG. 1, meandering cutouts 5 are, for example, made in the niobium or tantalum foil 1 for the sedimentation forming process such that anode contact surfaces 2 and anode contact lands 3 are formed, which are joined to one another via main lands 4. A foil can thus have more than 100, for example, 1000 or more, anode contact surfaces 2. The cutouts 5 can be obtained by punching or laser cutting. The dimensions of the anode contact surfaces 2 may be a few mm in each direction. To prevent sedimentation on the lands 3, they are, as shown in FIG. 2 in cross section, bent both at the connection site to the main land 4 and at the connection site to the anode contact surface 2, such that the lands 3 project vertically upward. The reference numeral 6 indicates the $NbO_x$ powder layer sedimented on the anode contact surface 2. The reference numeral 7 indicates that the powder also sediments on the main lands. This can be substantially prevented when the main lands 4 are bent, as indicated on the right-hand side of FIG. 2. In the illustrative schematic diagrams of FIGS. 1 and 2, the anode contact surfaces are shown as flat surfaces. It is equally possible to configure the anode contact surfaces in spoon-like convex form or in box form with a peripheral edge. The anode contact surfaces, which are shown by way of example in rectangular form, may also be circular or oval or of another shape.

An apparatus 1 for performing the sedimentation forming process is shown in FIGS. 3 to 5. It consists of two crossing vessels, in whose crossing points the sedimentation vessel 2 is present. The foil designated with small letters is conducted through one of the vessels (foil passage vessel), where it successively assumes the positions a, b, c, d and e (FIG. 4) with the directions of movement indicated by arrows in each case. The foil with a structure, for example, according to FIG. 2 is fed in at a, at b lowered below the liquid level 12 in the introduction space 3, then at c conducted through below the outlet of the sedimentation vessel, which forms the sediment layer, at d raised above the liquid level 12 in the discharge space 4, and at e sent to the ultrasound compaction, drying and sintering which are not shown.

In the other vessel (FIG. 5) arranged at right angles to the first vessel, the suspension comprising $NbO_x$ powder is pumped within the flow space 5 with the stirrer 10 around the sedimentation vessel 2, as indicated by the curved arrows. From the suspension flow pumped in circulation above the sedimentation vessel 2, powder particles descend and enter the sedimentation vessel 2 which is open at the top and provided with a calming grid 13. Powder is fed in through the fresh powder inlet 6 continuously at the same rate as it is withdrawn with discharged foils. Powder deposited at the bottom of the vessel at 8 is fed back to the suspension via line 7.

The foil passage vessel 3, 4 is screened (FIG. 4) from the suspension circulation vessel 5 by the angular screen 9, and a passage 11 is provided at the lower edge of the screen 9, through which powder not deposited on the foil can re-enter the suspension circulation space 5.

The present invention is illustrated in detail by the examples which follow:

Example 1

A niobium suboxide powder of the formula $NbO_{1.07}$ with a BET surface area of 1.24 $m^2$/g and a particle size distribution corresponding to D10=33 μm, D50=107 μm and D90=286 μm with an irregular shape was used. The powder consisted of sintered primary particles whose diameter was determined visually from SEM images to be about 620 nm.

The powder was scattered homogeneously onto the surface of a glass vessel filled with water comprising a small amount of a wetting agent. Close to the bottom of the vessel, a niobium foil whose structure corresponds to FIG. 2 with a thickness of 70 μm and 64 anode contact surfaces of 6×6 $mm^2$ was held on a pivoting arm under a cover. After 15 minutes, the foil was pivoted, such that it was no longer covered by the cover. Once an about 0.5 mm-thick layer of the powder had sedimented on the anode contact surfaces, the foil was again pivoted below the cover. No further powder was scattered onto the water surface. Once the powder still dispersed in the water had sedimented, the foil was withdrawn and placed onto a plate induced to vibrate vertically by an ultrasonic crystal for 30 seconds. The coated foil was then dried in a drying oven first at 60° C. for 4 hours, then at 80° C. for a further 4 hours and finally at 120° C. for another 4 hours. The dried foil was then introduced into a high-vacuum sintering furnace, wherein, after evacuating the furnace, the temperature of the furnace was brought to 1400° C. within 1 hour and kept at this temperature for another 15 minutes. This is followed by cooling to room temperature.

The anode contact surfaces were covered on the top side with a firmly adhering, somewhat rough, porous niobium suboxide layer. The increase in weight of the foil was 4.03 g, i.e., the average weight of an anode (of the coating of one anode contact surface) was 63 mg.

To test the capacitor properties, the foil with the 64 anodes downward was immersed into 0.1% by weight phosphoric acid, such that some of the lands 3 (FIG. 2) remained above the acid surface. Electrolytic oxidation is effected up to a forming voltage of 30 V at a current limited to 300 mA, and the voltage, after the current has fallen to 0, was maintained for another 2 hours.

The residual current was measured against 0.1% by weight phosphoric acid as the cathode. The capacitance was measured against 18% by weight sulfuric acid as the cathode at a bias voltage of 10 V and an alternating voltage with a frequency of 120 Hz. Averaged over the 64 anodes, a specific capacitance of 148 380 µFV/g and an averaged residual current of 0.43 nA/µFV were measured.

Example 2

A niobium suboxide powder of the formula $NbO_{0.95}$ with a specific surface area of 0.76 m$^2$/g and a particle size distribution corresponding to D10=0.85 µm, D50=2.0 µm, D90=8.0 µm and D100=36.2 µm was used.

A paste was produced by mixing 14.3% by weight of a binder containing 5% by weight of ethyl cellulose N7 in terpineol, 0.5% by weight of MEEE as a wetting agent and 85.2% by weight of the $NbO_x$ powder, and then homogenizing in a three-roll mill. The flow curve in the shear rate scan (rotation method) between 10 and 50 s$^{-1}$, recorded with a cone-plate analysis system with angle 4° and diameter 20 mm, of the slightly thixotropic paste shows viscosities of 90 Pas at 10 s$^{-1}$ and 5.2 Pas at 50 s$^{-1}$.

The paste was used to print three niobium foils (examples 2a, 2b and 2c) of size 10×10 cm$^2$ and thickness 70 µm using a 150 µm-thick stainless steel stencil with 108 cutouts of 4.6×4.6 mm$^2$, which were arranged in six double rows of 18 cutouts, on a semiautomatic EKRA M2 printing machine. The application was effected with a rubber coating blade with a Shore hardness of 90. Coating blade pressure and coating blade speed, and the mass of paste applied to the foil, were as follows:

Example 2a: 50 N, 60 mm/s, 0.997 g
Example 2b: 70 N, 80 mm/s, 0.946 g and
Example 2c: 30 N, 40 mm/s, 1.061 g.

Figure 6:
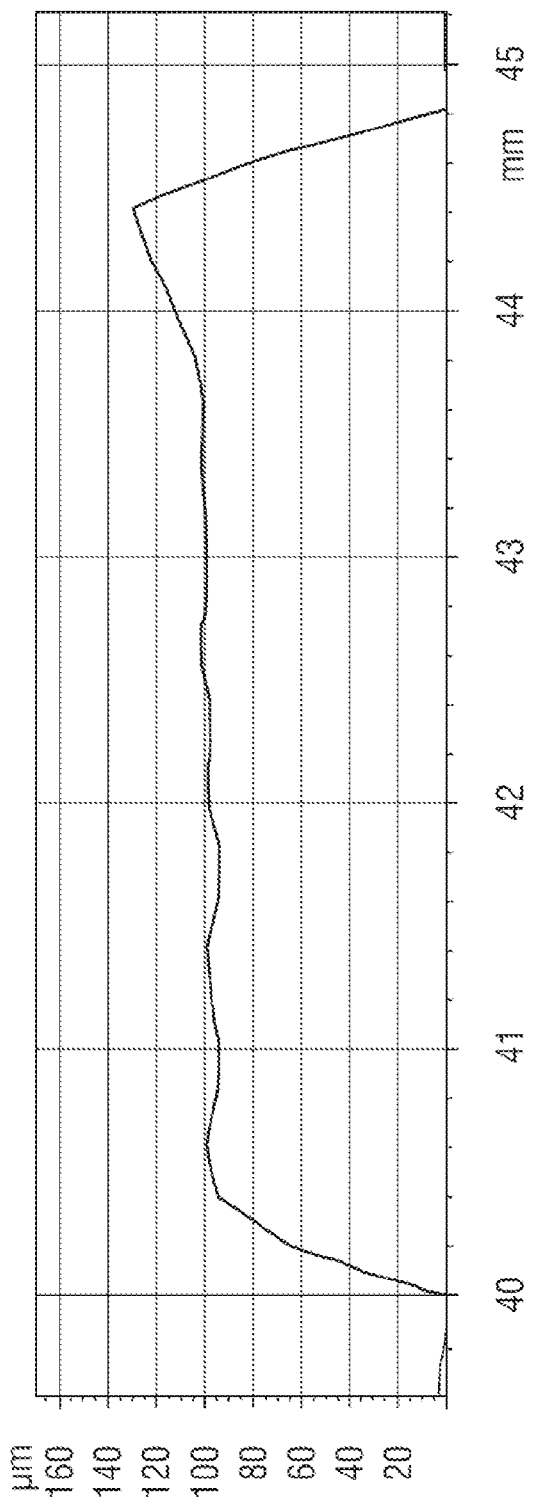
FIG. 6 shows the profilometer scan through a paste coating produced by the stencil printing process.
Figure 7:
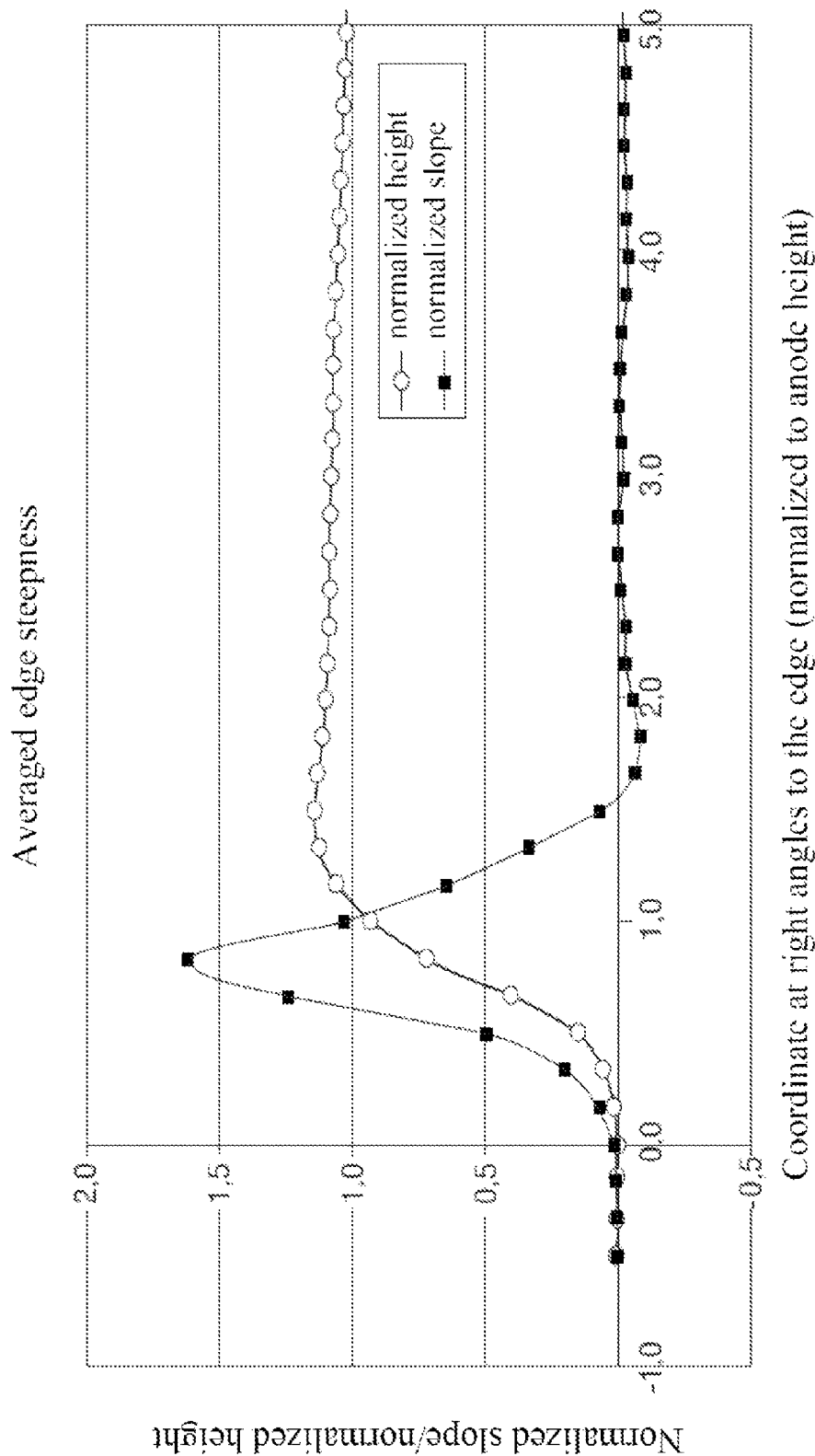
FIG. 7 shows the edge profile averaged over 20 measurement sites and normalized to the mean anode end height, and the slope, determined therefrom, of the edge of an inventive anode.

The printed foils were dried in a forced-air drying cabinet at 80° C. for 1 hour. The dried structures were characterized geometrically by means of a laser profilometer. FIG. 6 shows the thickness profile of the dried paste print of Example 2b. In the direction of advance of the coating blade, there is a slight rise in thickness (on the right-hand side of FIG. 6).

The dried printed foils were freed of the binder and sintered in a high-temperature high-vacuum oven in one operation with the following heating curve:
from room temperature to 350° C.: 25 K/min,
at 350° C.: hold for 15 min,
from 350 to 800° C.: 25 K/min,
from 800 to 1050° C.: 5 K/min,
from 1050° C. to end temperature: 25 K/min and
hold at end temperature for 15 min.

One foil was sintered at each of 1300° C., 1370° C. and 1440° C. (end temperature). The adhesion of the anodes was good in all foils. On impact of the foils against the table edge, no flaking-off could be found.

The anodes arranged on the foils were individualized by sawing (45-NIR(S) saw blade) and analyzed with regard to their capacitor properties as in Example 1. The following values were obtained as the mean from 10 anodes in each case:

Example 2a: 83 687 µFV/g, 0.203 nA/µFV,
Example 2b: 75 506 µFV/g, 0.158 nA/µFV and
Example 2c: 94 620 µFV/g, 0.386 nA/µFV.

The carbon content was less than 15 ppm for all anodes, and was between 4 and 6.4 ppm for the anodes of Example 2a, between 5.2 and 7.3 ppm for those of Example 2b, and between 3.7 and 5.8 ppm for the anodes of Example 2c.

The present invention is not limited to embodiments described herein; reference should be had to the appended claims.

The invention claimed is:

1. A process for producing a solid electrolyte capacitor with an anode comprising a sintered fine $NbO_x$ powder, where 0.5<x<1.7, the process comprising:
    forming a green anode body, wherein the forming is performed without applying a pressure;
    sintering the green anode body so as to provide a sintered anode body;
    electrolytically oxidizing the sintered anode body so as to provide an electrolytically oxidized anode body; and
    providing the electrolytically oxidized anode body with a cathode so as to provide the solid electrolyte capacitor.

2. The process as recited in claim 1, wherein the forming comprises:
    applying a $NbO_x$ powder to a flat niobium or tantalum sheet from a suspension comprising the sintered fine $NbO_x$ powder; and
    drying so as to provide the green anode body.

3. The process as recited in claim 2, wherein the applying is performed by sedimenting the $NbO_x$ powder onto the flat niobium or tantalum sheet and compacting with an ultrasound device.

4. The process as recited in claim 1, wherein the forming is performed by applying a paste comprising an organic binder to a flat niobium or tantalum sheet, drying the paste, and heating to a temperature of from 350 to 550° C. so as to remove the binder.

5. The process as recited in claim 4, wherein the applying of the paste is performed with a stencil printing.

6. The process as recited in claim 4, wherein a $NbO_x$ powder has a particle size distribution of D10=0.5 to 1.5 µm, D50=1.5 to 3 µm and D90=7 to 12 µm.

7. The process as recited in claim 4, wherein the paste has a viscosity, determined from a flow curve in a shear rate scan (rotation method) of between 10 and 50 s$^{-1}$, recorded with a cone-plate analysis system at an angle 4° and a diameter 20 mm, of 80 to 100 Pas at 10 s$^{-1}$ and 3.5 to 10 Pas at 50 s$^{-1}$.

8. The process as recited in claim 7, wherein an elastic component of the viscosity of the paste of the paste at a yield point is 500-15 000 Pas, and a viscous component of the viscosity of the paste is at least 0.5 and at most 1.5 times as great as the elastic component of the viscosity at the yield point.

9. The process as recited in claim 8, wherein the elastic component of the viscosity of the paste at a shear stress at least three times higher than at the yield point is reduced by at least 50%, and the viscous component is reduced to less than 2500 Pas.

10. The process as recited in claim 9, wherein the elastic component of the viscosity of the paste, 5 seconds after reduction in the shear stress to a value below one third of the shear stress at the yield point, is built up to 25 to 90% of a value before application of the elevated shear stress, and the viscous component of a complex viscosity, 5 seconds after removal of the shear stress, is 1.25 to 10 times greater than the elastic component of the complex viscosity.

\* \* \* \* \*